US007203832B2

(12) United States Patent
Onoda et al.

(10) Patent No.: US 7,203,832 B2
(45) Date of Patent: Apr. 10, 2007

(54) NETWORK SYSTEM

(75) Inventors: Mitsuhiro Onoda, Suita (JP); Kazuo Matoba, Akashi (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 807 days.

(21) Appl. No.: 10/357,346

(22) Filed: Feb. 4, 2003

(65) Prior Publication Data

US 2003/0149898 A1    Aug. 7, 2003

(30) Foreign Application Priority Data

Feb. 5, 2002    (JP) .............................. 2002-28301

(51) Int. Cl.
*G06F 1/24* (2006.01)
(52) U.S. Cl. ...................................... 713/162; 713/179
(58) Field of Classification Search ................ 713/162, 713/179
See application file for complete search history.

(56) References Cited

FOREIGN PATENT DOCUMENTS

| JP | 11-177629 | 7/1999 |
|----|-----------|--------|
| JP | 2001-57572 | 2/2001 |

OTHER PUBLICATIONS

Japanese Office Action dated Jul. 4, 2006, with English-language translation.

*Primary Examiner*—Thomas R. Peeso
(74) *Attorney, Agent, or Firm*—Buchanan Ingersoll & Rooney PC

(57) ABSTRACT

This network system includes a first device serving as a shared resource connected to a network, a second device connected to the network and including an object corresponding to the first device, and a third device for dynamically allocating first and second IP addresses of a plurality of available IP addresses to the first and second devices. The object has a static IP address, and the second device associates the first IP address allocated to the first device with the IP address of the object.

19 Claims, 6 Drawing Sheets

NETWORK SYSTEM

This application is based on Japanese Patent Application No. 2002-28301 filed in Japan on Feb. 5, 2002, the contents of which are hereby incorporated by reference.

BACKGROUND OF THE INVENTION

1. Field of the Invention

The present invention relates to security protection in an access to a network device.

2. Description of the Background Art

In a conventional network, a client typically accesses to a device connected to the network (referred to as network device) by using a unique Internet Protocol address (hereinafter referred to as IP address) of the device. Also, the client acquires the IP address corresponding to a domain name of a network device from a name server on the network, so that the client can access to the IP address to specify the network device.

In the access to the network device, an access may be performed for not only a legal object but also an illegal object, a security measurement must be employed against an illegal act. As the device security method, for example, the following methods are performed.

(a) In a device which is directly accessed through a network, a combination of user names and passwords managed by the device is checked, or only passwords is checked to protect the security.

(b) The combination of user names and passwords is checked on a server to protect the security when the server exists in the middle of access through the network.

In a conventional security protection, the combination of user names and passwords is mainly checked to manage the security protection. The IP address for specifying the network device is not sufficiently protected for security. More specifically, since a unique IP address allocated to the network device is disclosed on the network, the network device can be accessed by using the IP address. Since the IP address unique to the network device is necessary to specify the network device, the IP address is generally static, and security protection of the IP address is not considered against IP attack.

SUMMARY OF THE INVENTION

It is an object of the present invention to improve security of an IP address related to a network system.

In accordance with one aspect of the present invention, there is provided a network system including a first device serving as a shared resource connected to a network, a second device connected to the network and including an object corresponding to the first device, and a third device for dynamically allocating first and second IP addresses of a plurality of available IP addresses to the first and second devices. The object has a static IP address, and the second device associates the first IP address allocated to the first device with the IP address of the object.

In the network system, if a client accesses the static IP address, the access to the static IP address is routed to the first IP address associated with the static IP address on the second device, so that the client can access to the first device by the first IP address. The network in the network system includes the Internet. In addition, the IP address is a global IP address on the Internet. Although the first device is a shared resource, e.g., a printer or the like, the first device is not limited to the printer or the like.

In another aspect of the present invention, there is provided a network system including a first device serving as a shared resource connected to a network, a second device connected to the network and including an object corresponding to the first device, and a third device for allocating a plurality of IP addresses of a plurality of available IP addresses to the first device and for allocating a second IP address to the second device. The object has a static IP address, and the first device dynamically allocates a first IP address of the plurality of allocated IP addresses to the first device, and the second device associates the first IP address allocated to the first device with the IP address of the object.

In a further aspect of the present invention, there is provided a computer program product is executed on a second device in a network system. The network system includes a first device serving as a shared resource connected to a network, the second device connected to the network and including an object having a static IP address and corresponding to the first device, and a third device for dynamically allocating first and second IP addresses of a plurality of available IP addresses to the first and second devices. The program product includes an instruction for associating the IP address allocated to the first device with the IP address of the object, and an instruction for performing routing to the first device serving as the shared resource by the first IP address associated with the IP address of the object when the IP address of the object is accessed.

The network program product may be stored in a computer readable recording medium. The network program product is stored in the computer readable recording medium as described above to give portability to the computer program product and to make it possible to easily operate the network program product on the computer. Since the network program product can be carried through an electronic communication line, the network program product can be easily executed even in a computer installed in a further remote area.

As the computer readable recording medium, a magnetic recording medium such as a flexible disk or a hard disk, an optical recording medium such as a CD-ROM, a CD-R, a CD-RW, or a DVD, a magneto-optical recording medium such as an MO or MD, or a semiconductor recording medium such as an EEPROM, a DRAM, or a flash memory can be used. In addition, the network program product stored in these recording medium is read by a recording medium read device, such as a hard disk drive, a flexible disk drive, or an optical disk drive, and the program product is executed on the computer.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF PREFERRED EMBODIMENTS

Figure 1:
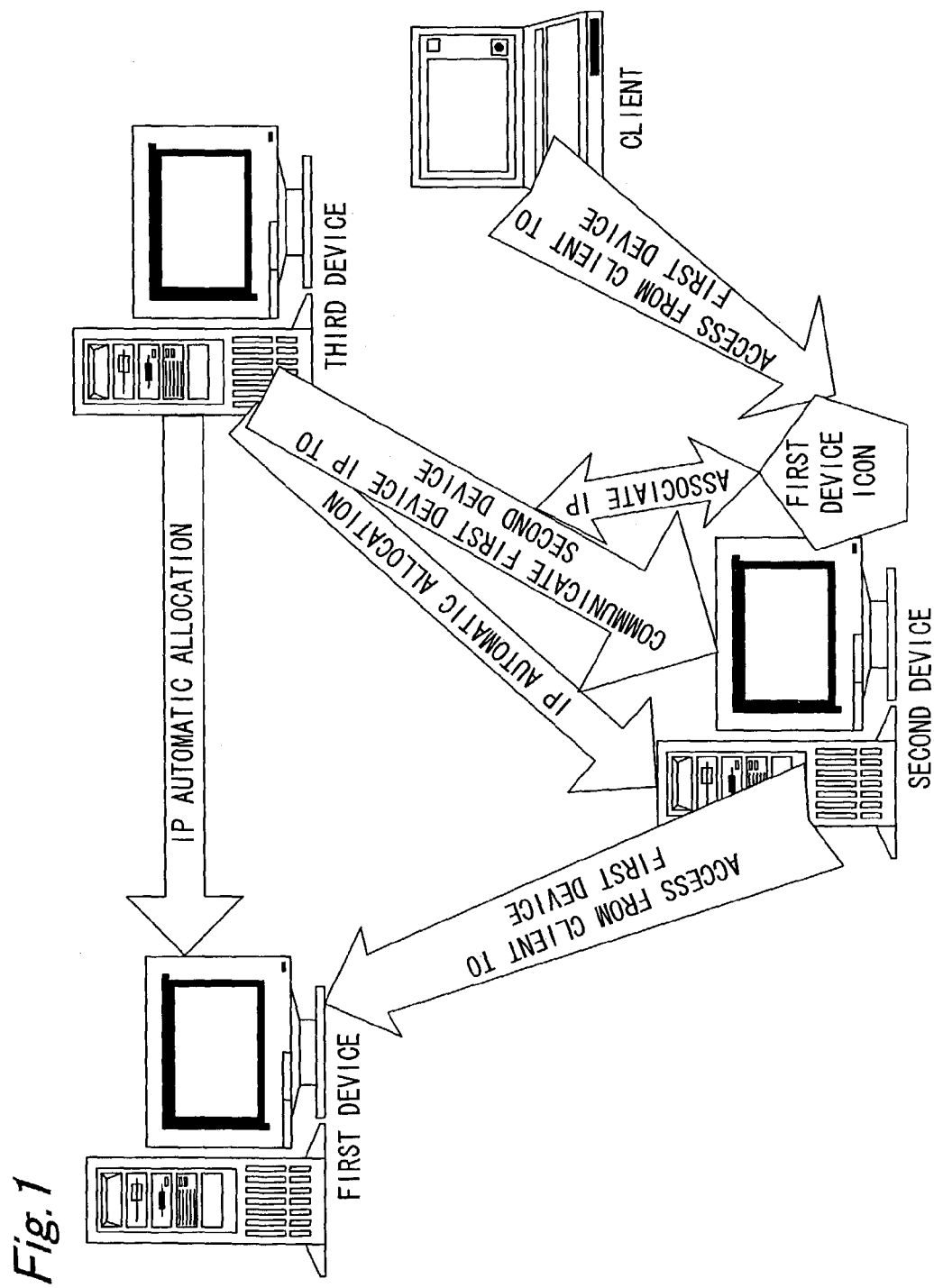
FIG. 1 is a schematic diagram of a network system according to the first embodiment of the present invention.

A network system and a program according to embodiments of the present invention will be described below with reference to the accompanying drawings. The same reference numerals as in the drawings denote the same parts in the drawings. In the accompanying drawings, an IP address is abbreviated to an "IP" for descriptive convenience.

First Embodiment

A network system according to the first embodiment of the present invention will be described below with reference to FIGS. 1 to 4. The network system indirectly discloses a shared resource by an object (icon) having a static IP address (to be referred to as a virtual IP address hereinafter) which is virtually allocated. The shared resource is used through a network, therefore the shared resource is indirectly accessed through another device having an icon associated with the shared resource to prevent the shared resource from being directly accessed. A user can use the shared resource by only the virtual IP address. The IP addresses of the shared resource and the other device are periodically changed in a short period of time to improve the security of the disclosed shared resource.

Figure 2:
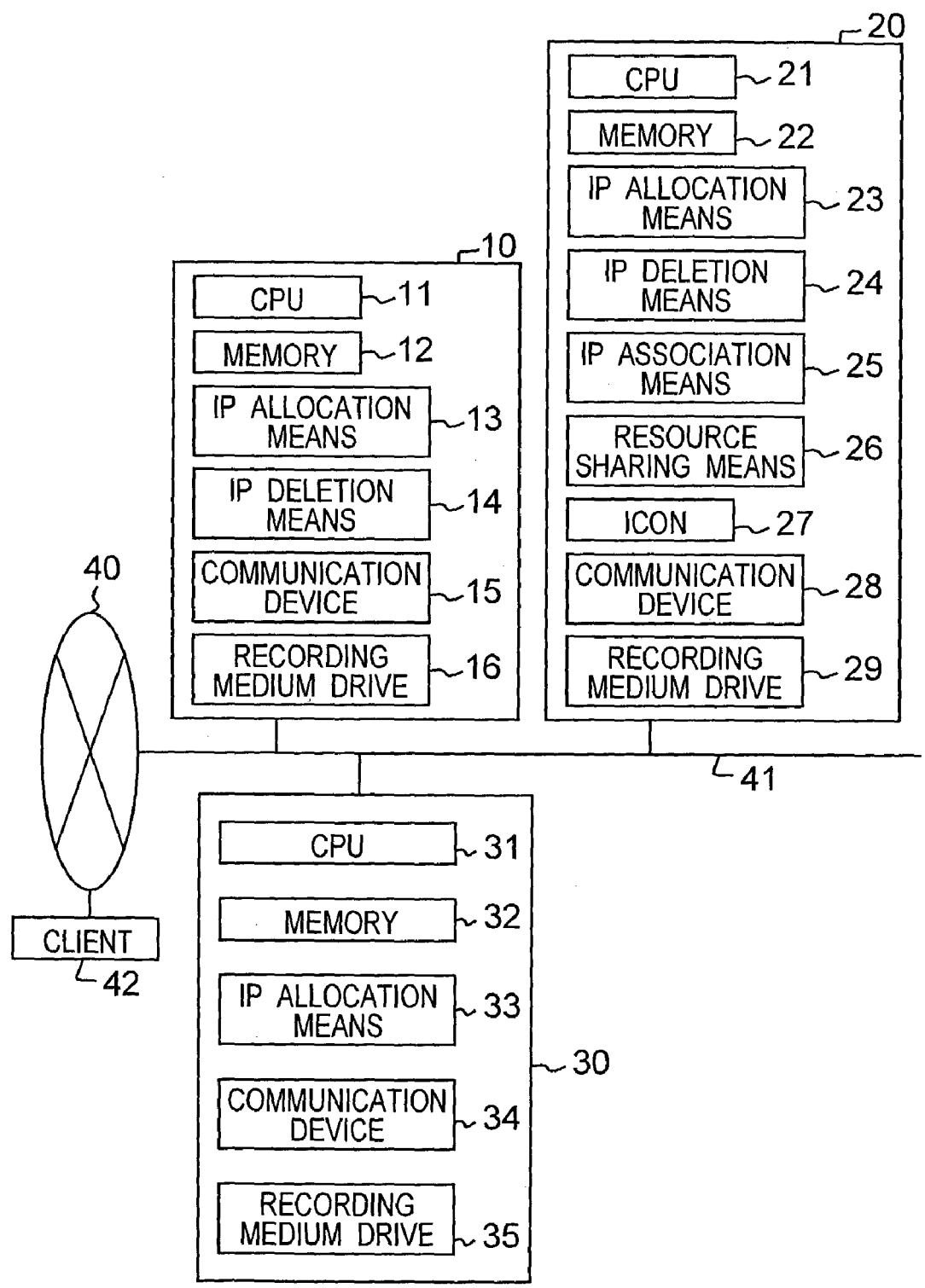
FIG. 2 is a block diagram of the configuration of the network system according to the first embodiment of the present invention.

This network system will be described below with reference to the schematic diagram in FIG. 1. The network system includes three devices. The first device is a shared resource which is disclosed by a virtual IP address through the network and used. For example, a printer, a computer, or the like is used as the first device. The network system may include a plurality of the first devices as the shared resource. The second device has an icon serving as an object which is indirectly accessed by the first device serving as the shared resource. The third device periodically allocates IP addresses to the first and second devices and informs the second device of the IP address allocated to the first device. The second device stores the first IP address allocated to the first device and the disclosed virtual IP address such that the first IP address is associated with the virtual IP address. When a client 42 accesses the first device through networks 40 and 41, the client 42 is caused to indirectly access the first device through the icon, as shown in FIG. 2.

In addition, the definite configuration of the network system will be described below by using the block diagram in FIG. 2. It is noted that an IP address is abbreviated to an "IP" for descriptive convenience in FIG. 2. This network system includes three devices 10, 20, and 30 connected to networks 40 and 41. The first device 10 is a shared resource which can be used such that the client 42 accesses the shared resource through networks 40 and 41. The second device 20 has an icon 27 serving as an object corresponding to the first device 10. The third device 30 allocates first and second IP addresses selected from a plurality of available IP addresses to the first and second devices 10 and 20, respectively. The allocation of the IP addresses to the first and second devices 10 and 20 is repeated at intervals of predetermined periods of time, and IP addresses allocated to the devices are periodically changed in a short period of time at any time. Since the IP addresses of the first device 10 and the second device 20 are changed at any time as described above, the first and second devices 10 and 20 are not easily directly accessed. For this reason, it is difficult to illegally access the first and second devices 10 and 20, and the security can be improved.

In the network system, when the client 42 accesses a virtual IP address through the networks 40 and 41, the client 42 is caused to access the second device 20. In addition, in the second device 20, the first device 10 is made available by the icon 27. The client 42 can not directly access to the first device 10, since the first device can be indirectly used through the icon 27, so that the directly accessing the first device 10 and an illegal access are made difficult.

In an access routing method and an access providing system described in Japanese Laid-open Patent Publication No. 2001-57572, a router associates a source IP address serving as a source with a c-o IP address by an access routing function. The network system according to the first embodiment of the present invention is completely different from the access providing system in that an IP address itself to be allocated is dynamically changed.

Constituent elements of the network system will be described below by using FIG. 2. The network is constituted by, e.g., an internet 40 and an intranet 41. The first device 10 serving as a shared resource includes a central processing unit (CPU) 11, a memory 12, a communication device 15, and a recording medium read device 16. The first device 10 may be, e.g., a network printer and may include a print engine, a scanner, or the like. The second device 20 includes a CPU 21, a memory 22, a communication device 28, and a recording medium read device 29. An object corresponding to the first device 10 may be displayed as an icon 27 on a display unit (not shown) of the second device 20. The icon 27 is clicked to execute the object, so that the first device 10 serving as a shared resource can be used. The third device 30 includes a CPU 31, a memory 32, a communication device 34, and a recording medium read device 35.

In addition, programs executed on the respective devices in the network system will be described below. The network program controls an access to the first device 10 serving as a shared resource through the networks 40 and 41. More specifically, the network program is constituted by first, second, and third programs executed on respective devices. In particular, the network program includes the second program as a main body. Furthermore, the second program serving as the main body is assisted by the first and third programs. The configurations of the programs executed on the respective devices will be described below.

The first program executed on the first device 10 includes:

(a) an IP allocation means 13 for allocating the first IP address to the first device 10; and (b) an IP deletion means 14 for deleting the first IP address from the first device 10.

The second program executed on the second device 20 includes:

(a) an IP allocation means 23 for allocating the second IP address to the second device 20;

(b) an IP deletion means 24 for deleting the second IP address from the second device 20;

(c) an IP association means 25 for associating the first IP address allocated to the first device 10 with a virtual IP address of the icon 27; and (d) a resource sharing means 26 for, when the client 42 accesses the virtual IP address through the networks 40 and 41, causing the client 42 to access the second device 20 and for making the first device 10 serving as a shared resource available by the icon 27 in the second device.

The third program executed on the third device 30 includes:

(a) an IP address allocation means 33 for allocating the two first and second IP addresses of the plurality of available IP addresses to the first and second devices.

Figure 3:
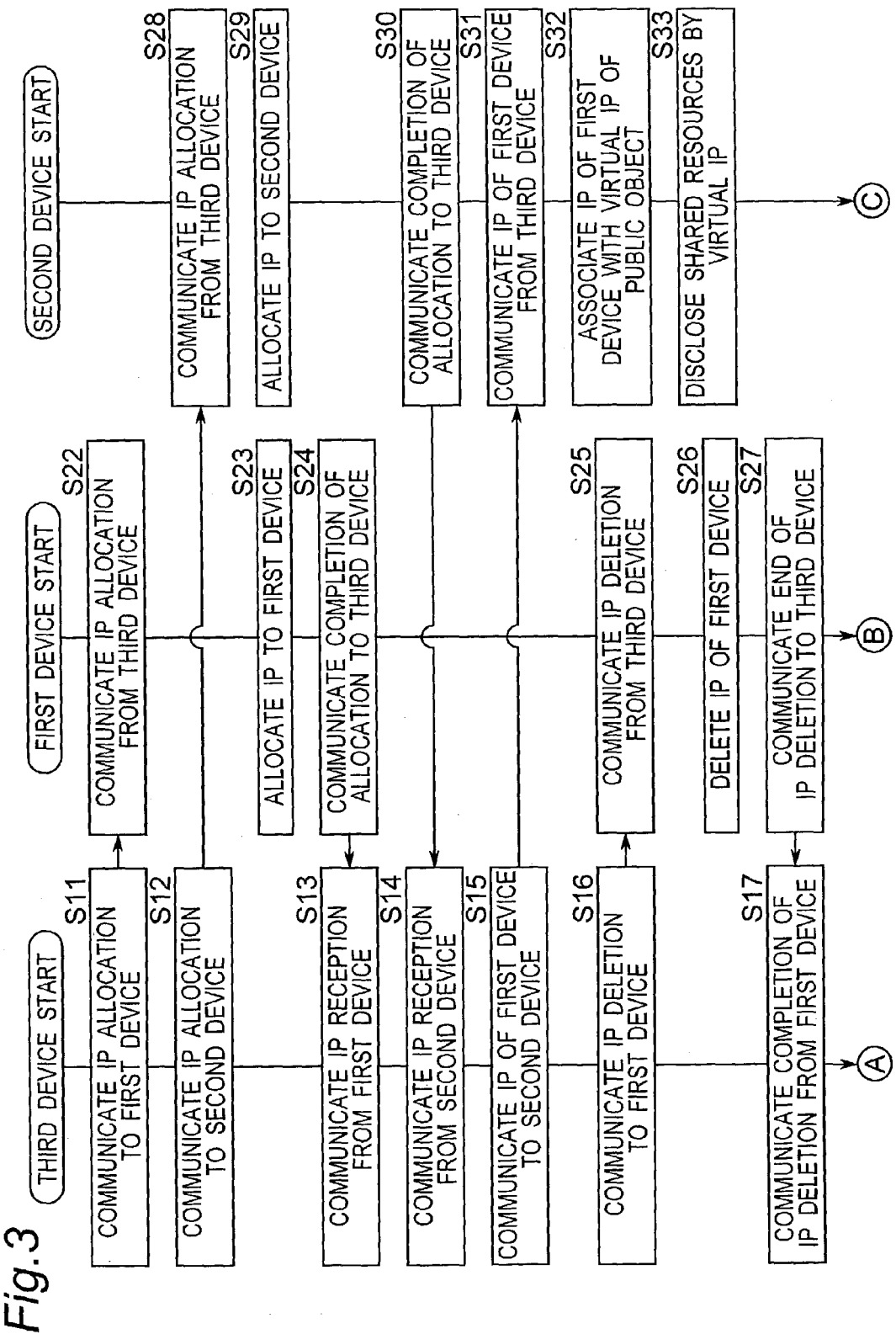
FIG. 3 is the first half of a flow chart of procedures executed on each device in the network program according to the first embodiment of the present invention.
Figure 4:
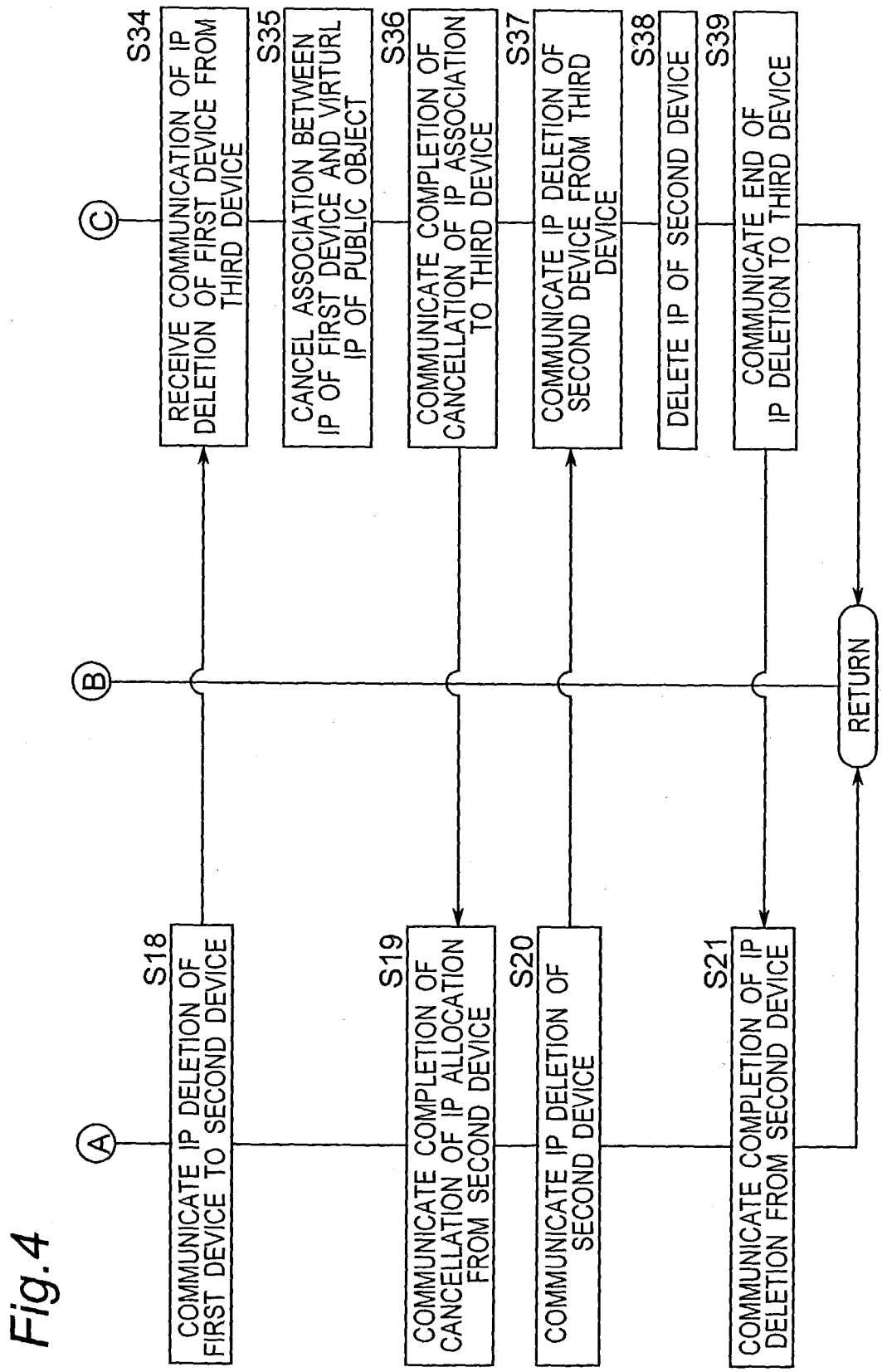
FIG. 4 is a flow chart of the second half of the subsequence of the network program in FIG. 3.

More specifically, the network program is constituted by the following procedures as shown in the flow charts in FIGS. 3 and 4. It is noted that an IP address is abbreviated to an "IP" for descriptive convenience in FIGS. 3 and 4. In the following description, the procedures executed on the three devices will be described in a time-serial order without being classified.

(a) In the third device 30, the two first and second IP addresses are selected from a plurality of available IP addresses at intervals of predetermined periods of time, it is communicated that the first IP address is allocated to the first device 10 (S11), and it is communicated that the second IP address is allocated to the second device 20 (S12).

As a protocol used for dynamically allocating an IP address to a network device, a dynamic host configuration protocol (hereinafter referred to as DHCP) is known. The network program according to the present invention is different from a conventional DHCP in that the IP addresses allocated to the first and second devices are changed at intervals of predetermined periods of time.

(b) On the other hand, in the first device 10, allocation of the first IP address is communicated (S22), and the first IP address is allocated to the first device 10 (S23). Thereafter, completion of allocation is communicated to the third device 30 (S24). The third device 30 receives a notice of the completion of allocation (S13).

(c) In the second device 20, allocation of the second IP address is communicated (S28), and the second IP address is allocated to the second device 20 (S29). Thereafter, completion of allocation is communicated to the third device 30 (S30). The third device 30 receives a notice of the completion of allocation (S14).

(d) The third device 30 communicates the first IP address of the first device 10 to the second device 20 (S15). The second device receives the IP address (S31).

(e) In the second device 20, the first IP address of the first device 10 is associated with the virtual IP address of the icon 27 (S32).

(f) The first device 10 associated with the virtual IP address can be used by accessing the virtual IP address. More specifically, the first device 10 serving as a shred resource is disclosed on the network by the virtual IP address associated with the first IP address (S33).

In this manner, when an access from the client 42 is accepted by the virtual IP address through the networks 40 and 41, the access is accepted by the second device 20, and the first device 10 can be used by the first IP address associated with the virtual IP address of the icon 27 on the second device 20. On the other hand, since the first IP address of the first device 10 is not disclosed, a direct access performed for an illegal object is difficult, and the security can be improved.

(g) Thereafter, the third device 30 requests the first device 10 to delete the first IP address allocated to the first device 10 (S16). In the first device 10, a request for deletion of the IP address is received (S25), and the allocation of the first IP address is deleted (S26). Thereafter, completion of deletion is communicated to the third device 30 (S27), and it is received by the third device 30 that the deletion is completed (S17).

(h) The third device 30 communicates the completion of deletion of the IP address of the first device 10 to the second device 20 (S18). The second device 20 receives the notice of the completion of deletion of the IP address (S34), and the association between the first IP address of the first device 10 and the virtual IP address is canceled (S35), and completion of the cancellation of association is communicated to the third device 30 (S36). The third device 30 receives a notice of the cancellation of association (S19).

(i) The third device 30 requests the second device 20 to delete the second IP address allocated to the second device 20 (S20). The second device 20 receives a request for deletion of the IP address (S37), and deletes the allocation of the second IP address (S38). Thereafter, completion of deletion is communicated to the third device 30 (S39), and it is received by the third device 30 that the deletion is completed (S21).

(j) Thereafter, returning to the start, new IP addresses are allocated to the first and second devices 10 and 20.

In this manner, since the IP addresses allocated to the first and second devices 10 and 20 are changed in a short period of time, an illegal access which is directly performed to a network device through the networks 40 and 41 can be made difficult, and the security can be improved.

The network program which can be executed on the computer is stored in a recording medium which can be read by a computer. The network program is stored in the computer readable recording medium to give portability to the network program, so that the network program can be easily operated on the computer. Since this network program can be conveyed through an electronic communication line, the network program can be easily executed even in a computer installed in a further remote area.

As the computer readable recording medium, a magnetic recording medium such as a flexible disk or a hard disk, an optical recording medium such as a CD-ROM, a CD-R, a CD-RW, or a DVD, a magneto-optical recording medium such as an MO or MD, or a semiconductor recording medium such as an EEPROM, a DRAM, or a flash memory can be used. In addition, the network program stored in these recording medium is read by the recording medium drives 16, 29, and 35 and executed on the computer.

Second Embodiment

A network system and a network program according to the second embodiment of the present invention will be described below with reference to FIGS. 5 and 6. It is noted that an IP address is abbreviated to an "IP" for descriptive convenience in FIGS. 5 and 6. This network system is different from the network system according to the first embodiment in that a plurality of IP addresses of a plurality of available IP addresses are allocated to a first device 10 by a third device 30 and the first device 10 selects one IP address from the plurality of IP addresses. In this manner, the third device 30 allocates the plurality of IP addresses to the first device 10, and one IP address is selected by the first device 10, so that the IP address allocated to the first device 10 is not easily specified on a manager side. For this reason, the security can be improved.

The network program will be described below with reference to the flow chart in the FIGS. 5 and 6. More specifically, in the network system, a first program executed on the first device includes an IP allocation means 13 for allocating a first IP address selected from the plurality of IP addresses to the first device 10.

A third program executed on the third device 30 includes an IP address allocation means 33 for selecting a plurality of IP addresses from a plurality of available IP addresses, allocating the IP addresses to the first device 10, and allocating a second IP address selected from the remaining available IP addresses to the second device 20.

For this reason, the IP address allocated to the first device 10 is selected from the plurality of allocated IP addresses in the first device 10, the allocated IP address cannot be easily specified, and the security can be improved. As described in the first embodiment, in addition to the above description, different sets of IP addresses may be allocated to the first and second devices 10 and 20 at intervals of predetermined periods of time.

Figure 5:
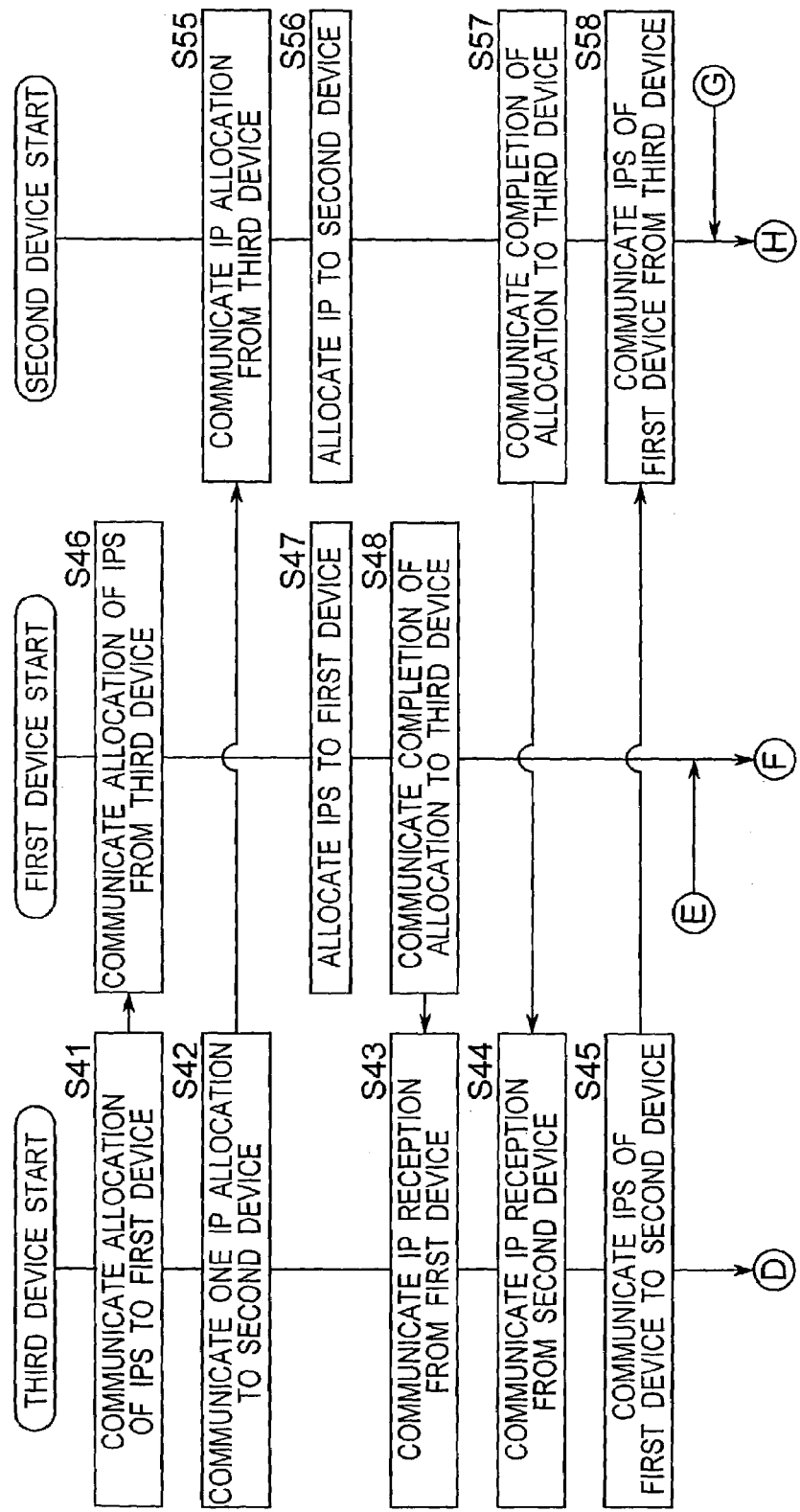
FIG. 5 is the first half of a flow chart of procedures executed on each device in a network program according to the second embodiment of the present invention.
Figure 6:
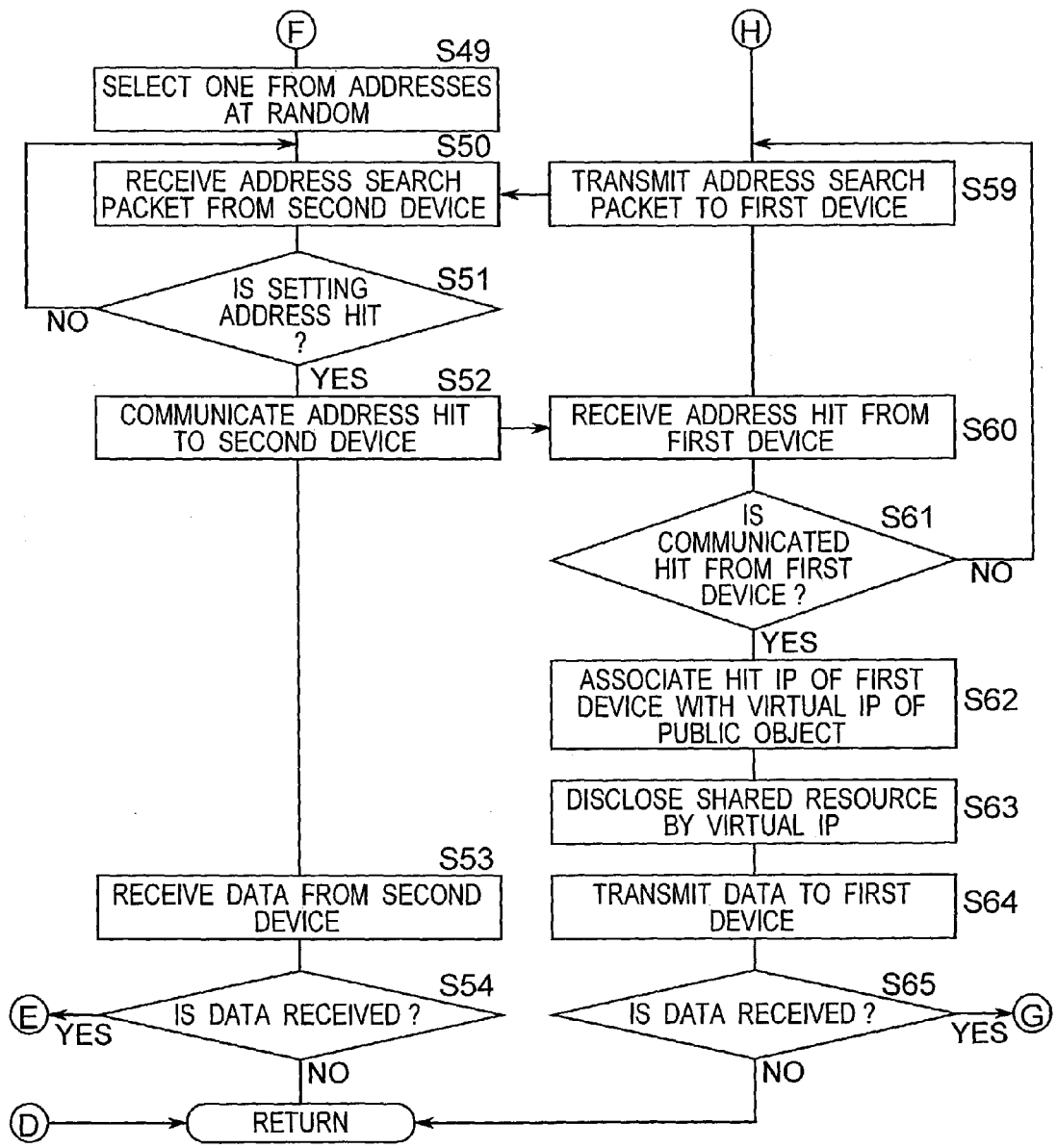
FIG. 6 is a flow chart of the second half of the subsequent of the network program in FIG. 5.

More specifically, the network program is constituted by the following procedures as shown in the flow charts in FIGS. 5 and 6.

(a) In the third device 30, a plurality of IP addresses are selected from a plurality of available IP addresses, it is communicated to the first device 10 that the plurality of IP addresses are allocated to the first device 10 (S41). The second IP address is selected from the remaining available IP addresses, it is communicated to the second device 20 that the second IP address is allocated to the second device 20 (S42).

(b) On the other hand, the first device 10 receives a notice of allocation of the plurality of IP addresses (S46), and allocates the plurality of IP addresses to the first device 10 (S47). Thereafter, completion of allocation is communicated to the third device 30 (S48). The completion of allocation is communicated to the third device 30 (S43).

(c) In the second device 20, allocation of the second IP address is communicated (S55), and the second IP address is allocated to the second device 20 (S56). Thereafter, completion of allocation is communicated to the third device 30 (S57). The third device 30 receives a notice of the completion of allocation (S44).

(d) The third device 30 communicates the plurality of IP addresses of the first device 10 to the second device 20 (S45). The second device 20 receives the IP addresses (S58).

(e) In the first device 10, one IP address is selected from the plurality of IP addresses at random (S49), and it is served as a first IP address to be allocated to the first device 10.

(f) In the second device 20, an address search packet is transmitted to the first device 10 to search for the first IP address selected by the first device 10 from the plurality of IP addresses allocated to the first device 10 (S59). The first device 10 receives the address search packet (S50), and decides whether the set first IP address is hit or not (S51). When the set first IP address is not hit, the first device 10 again receives the address search packet (S50). On the other hand, when the first IP address is hit, an address hit is communicated to the second device 20 (S52). The second device 20 receives an address hit notice (S60). When the address hit is not received within a predetermined period of time (S61), the address search packet is transmitted (S59). As the address search packet, for example, PING or a data packet which is specially defined can be used.

As described above, a plurality of IP addresses are allocated to the first device 10 by the third device 30, so that one IP address is selected by the first device 10 every transmission/reception of data. For this reason, the first IP address is not easily specified on a manager side. In this manner, it can be made difficult to illegally access the first IP address, and the security can be improved.

(g) In the second device 20, the first IP address of the first device 10 can be associated with a virtual IP address of an icon 27 (S62).

(h) The first device 10 which is associated with the virtual IP address can be used by accessing the virtual IP address. More specifically, the first device 10 serving as a shared resource is disclosed on a network by the virtual IP address associated with the first IP address (S63).

In this manner, when an access is accepted by the virtual IP address through the networks 40 and 41, the access is accepted by the second device 20, and the first device can be used by the first IP address associated with the virtual IP address of an icon on the second device. On the other hand, since the first IP address of the first device 10 is selected from the plurality of IP addresses and is not disclosed, a direct access performed for an illegal object becomes difficult, and the security can be improved.

(i) Set data or the like is transmitted from the second device 20 to the first device 10 (S64) and received by the first device 10 (S53). When transmission/reception of the data is completed in each of the second and first devices 20 and 10 (S54, S65), the control flow returns to the procedure (S49) of selecting one IP address from the plurality of IP addresses at random in the first device 10. In the second device 20, the control flow returns to the procedure (S59) of transmitting an address search packet to the first device 10.

In this manner, in the first device 10, the IP address can be changed at any time within the range of the plurality of allocated IP addresses.

The network program which can be executed on the computer may be stored in a recording medium which can be read by a computer.

According to the network system of the present invention, a first IP address of the first device serving as a shared resource and a second IP address of the second device having an object corresponding to the first device are changed at any time. In this manner, since it is difficult to directly access the first IP address allocated to the first device serving as the shared resource, an illegal access becomes difficult, and the security can be improved.

According to the network system of the present invention, a plurality of IP addresses are allocated to the first device serving as a shared resource, and first IP address selected every transmission/reception by the first device is used. For this reason, the first IP address is not easily specified on a manager side. In this manner, it can be made difficult to illegally access the first IP address, and the security can be improved.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A network system comprising:
    a first device serving as a shared resource connected to a network;
    a second device connected to the network and including an object corresponding to the first device; and
    a third device for dynamically allocating first and second IP addresses of a plurality of available IP addresses to the first and second devices,
    wherein the object has a static IP address, and the second device associates the first IP address allocated to the first device with the IP address of the object.

2. A network system according to claim 1, wherein the third device allocates the first and second IP addresses to the first and second devices such that the first and second IP addresses are periodically changed.

3. A network system according to claim 1, wherein the first device is a printer.

4. A network system according to claim 1, wherein the object is an icon.

5. A network system comprising;
- a first device serving as a shared resource connected to a network;
- a second device connected to the network and including an object corresponding to the first device; and
- a third device for allocating a plurality of IP addresses of a plurality of available IP addresses to the first device and for allocating a second IP address to the second device,
- wherein the object has a static IP address, and the first device dynamically allocates a first IP address of the plurality of allocated IP addresses to itself, and the second device associates the first IP address allocated to the first device with the IP address of the object.

6. A network system according to claim 5, wherein the first device allocates the first IP address to the first device such that the first IP address is changed every transmission or reception of data.

7. A network system according to claim 5, wherein the first device is a printer.

8. A network system according to claim 5, wherein the object is an icon.

9. A computer program product executed on a second device in a network system, the network system including a first device serving as a shared resource connected to a network, the second device connected to the network and including an object corresponding to the first device having a static IP address, and a third device for dynamically allocating first and second IP addresses of a plurality of available IP addresses to the first and second devices, the computer program product including:
- an instruction for associating the first IP address allocated to the first device with the IP address of the object; and
- an instruction for routing to the first device serving as the shared resource by the first IP address associated with the IP address of the object when the IP address of the object is accessed.

10. A computer program product according to claim 9, wherein the first device is a printer.

11. A computer program product according to claim 9, wherein the object is an icon.

12. A security management method used in a network system including a first device serving as a shared resource connected to a network, and a second device connected to the network and including an object corresponding to the first device having a static IP address, the method comprising the steps of:
- a) dynamically allocating first and second IP addresses of a plurality of available IP addresses to the first and second devices; and
- b) associating the first IP address allocated to the first device with the IP address of the object.

13. A security management method according to claim 12, wherein the first and second IP addresses are allocated to the first and second devices such that the first and second IP addresses are periodically changed in the allocating step.

14. A security management method according to claim 12, wherein the first device is a printer.

15. A security management method according to claim 12, wherein the object is an icon.

16. A security management method used in a network system including a first device serving as a shared resource connected to a network, and a second device connected to the network and including an object corresponding to the first device having a static IP address, the method comprising the steps of:
- a) allocating a plurality of IP addresses of a plurality of available IP addresses to the first device and allocating a second IP address to the second device;
- b) dynamically allocating a first IP address of the plurality of allocated IP addresses to the first device; and
- c) associating the first IP address allocated to the first device with the IP address of the object.

17. A security management method according to claim 16, wherein the first IP address is allocated to the first device such that the first IP address is changed every transmission/reception of the data in the dynamically allocating step.

18. A security management method according to claim 16, wherein the first device is a printer.

19. A security management method according to claim 16, wherein the object is an icon.

* * * * *